(12) United States Patent
Kitanaka

(10) Patent No.: US 8,106,620 B2
(45) Date of Patent: Jan. 31, 2012

(54) VECTOR CONTROL DEVICE FOR ALTERNATING-CURRENT ELECTRIC MOTOR

(75) Inventor: Hidetoshi Kitanaka, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 461 days.

(21) Appl. No.: 12/377,644

(22) PCT Filed: Aug. 29, 2006

(86) PCT No.: PCT/JP2006/316961
§ 371 (c)(1),
(2), (4) Date: Feb. 16, 2009

(87) PCT Pub. No.: WO2008/026249
PCT Pub. Date: Mar. 6, 2008

(65) Prior Publication Data
US 2010/0237821 A1    Sep. 23, 2010

(51) Int. Cl.
*H02P 27/04* (2006.01)
(52) U.S. Cl. ......... 318/807; 318/801; 318/808; 318/812
(58) Field of Classification Search .................. 318/807, 318/812, 808, 801
See application file for complete search history.

(56) References Cited

U.S. PATENT DOCUMENTS

| | | | | |
|---|---|---|---|---|
| 4,788,485 A | * | 11/1988 | Kawagishi et al. | 318/811 |
| 5,231,339 A | * | 7/1993 | Kishimoto et al. | 318/807 |
| 5,373,223 A | * | 12/1994 | Akagi et al. | 318/722 |
| 6,166,514 A | * | 12/2000 | Ando et al. | 318/811 |
| 6,642,689 B2 | * | 11/2003 | Ishida et al. | 318/807 |
| 6,995,540 B2 | * | 2/2006 | Maruyama et al. | 318/808 |
| 2002/0141212 A1 | | 10/2002 | Ishida et al. | |

FOREIGN PATENT DOCUMENTS

| | | |
|---|---|---|
| JP | 2000-125410 A | 4/2000 |
| JP | 2002-238298 A | 8/2002 |

OTHER PUBLICATIONS

Akira Kimura, et al., "Study on the Stabilization of Control System for Induction Motor Driven Rolling Stock", Magazine D of articles of Institute of Electrical Engineers, 1990, pp. 291-300 vol. 110, No. 3.
Keiichiro Kondo, et al., "Study on the Rotor Flux in Induction Motor in Speed Sensorless Control for Railway Vehicle Traction", Materials of Society for Semiconductor Power Conversion, 2003, pp. 69-74, SPC03-100.
International Search Report for PCT/JP2006/316961 completed Nov. 28, 2006.

* cited by examiner

Primary Examiner — Rita Leykin
(74) Attorney, Agent, or Firm — Buchanan Ingersoll & Rooney PC

(57) ABSTRACT

There is provided a vector control device for an alternating-current electric motor having a damping controller which automatically calculates an optimum damping operation amount and does not require any gain setting itself, whereby an adjustment work of a control system can be simplified. The vector control device is equipped with a vector controller 30 for executing vector control on the alternating-current electric motor 6 in accordance with a current command or a torque command, and a damping controller 40 for calculating a damping operation amount for suppressing variation of a capacitor voltage Efc. The damping controller 40 calculates a variation rate of the capacitor voltage Efc, operates the current command or torque command of the vector controller 30 on the basis of the damping operation amount corresponding to the variation rate and controls the inverter 4 so that current flowing in the inverter varies so as to suppress the variation thereof with respect to the variation of the capacitor voltage Efc.

5 Claims, 5 Drawing Sheets

VECTOR CONTROL DEVICE FOR ALTERNATING-CURRENT ELECTRIC MOTOR

TECHNICAL FIELD

The present invention relates to a vector control device for an alternating-current electric motor in which the alternating-current electric motor is subjected to vector control.

BACKGROUND ART

A technique of executing vector control on an alternating-current electric motor by using an inverter has been broadly used in an industrial field. This has been also broadly used for electric railroads. It has been known that when the above system is applied to a direct-current feeding railroad, electric oscillation occurs in an LC filter circuit comprising a reactor and a capacitor for absorbing higher harmonic waves which are disposed at the direct current side of an inverter, the voltage between both the terminals of the capacitor (capacitor voltage) is vibrated, and the control of the electric motor is destabilized. A damping control method to suppress this is disclosed in Non-patent document 1 and Non-patent document 2.

Non-patent document 1: Akira Kimura, et al., "Study on the Stabilization of Control System for Induction Motor Driving Rolling Stock", Magazine D of articles of Institute of Electrical Engineers, Volume 110, No. 3, pp 291-300 in 1990

Non-patent document 2: keiichiro Rondo, et al., "Study on the Rotor Flux in Induction Motor in speed Sensorless Control for Railway Vehicle Traction", Materials of Society for Semiconductor Power Conversion, SPC03-100, pp 69-74 in 2003.

According to both the Non-patent documents 1 and 2, the electric oscillation of the LC filter circuit is suppressed by adding a damping controller for detecting the voltage of a capacitor, extracting an oscillation component by a band pass filter (hereinafter referred to as BPF) to adjust the phase, multiplying the adjusted phase by a gain to obtain a damping operation amount, adding the damping operation amount to a slip frequency command (non-patent document 1) or a torque command (non-patent document 2).

The non-patent document 1 relates to an application to an electric motor control system to which slip frequency control is applied, and the Non-patent document 2 relates to an application to an electric motor control system to which vector control is applied.

DISCLOSURE OF THE INVENTION

Problem to be Solved by the Invention

The conventional damping controller is constructed by a control system comprising BPF and a gain. With respect to the setting of BPF, the constant thereof may be set so that the resonance frequency component of the reactor and the capacitor can be detected without phase delay. However, with respect to the setting of the gain, if the gain is excessively lower than the optimum value, the effect of suppressing the electric oscillation would be insufficient. If the gain is excessively higher, electric oscillation having a higher frequency than the resonance frequency would continually occur. Therefore, the gain must be set to the optimum intermediate value therebetween.

However, as disclosed in the non-patent document 1, the optimum gain range which can effectively suppress the electric oscillation of the LC filter circuit to implement stabilization is extremely narrow, and it is not easily adjusted. In the non-patent document 1, it is attempted that the control system is analyzed in a frequency area to calculate the optimum gain setting. However, the calculation process is not simple, and a work of setting the calculated gain to the control system is still required. Furthermore, as disclosed in the non-patent document 1, the constant of the electric motor is used in the equation of the calculation process, and thus if the type of the electric motor to be connected to the inverter is changed, the corresponding gain must be calculated and set again. As described above, the conventional gain setting of the damping controller has been a troublesome work.

The present invention has been implemented to solve the foregoing problem, and has an object to provide a vector control device for an alternating-current electric motor that can simplify a control system adjusting work for suppressing electric oscillation of an LC filter circuit.

Means of Solving the Problem

According to the present invention, a vector control device for an alternating-current electric motor which has an LC filter circuit comprising a reactor and a capacitor at a direct-current power supply side and an inverter converting a voltage across the capacitor (capacitor voltage) to an AC voltage having any frequency, comprises a vector controller for executing vector control on the alternating-current electric motor in accordance with a current command or a torque command, and a damping controller for calculating a damping operation amount for suppressing variation of the capacitor voltage, wherein the damping controller calculates a variation rate of the capacitor voltage, operates the current command or the torque command of the vector controller on the basis of the damping operation amount corresponding to the variation rate and controls the inverter so that current flowing in the inverter varies so as to suppress the variation of the capacitor voltage.

Effect of the Invention

According to the vector control device for the alternating-current electric motor of the present invention, the adjustment work of the control system for suppressing the electric oscillation of the LC filter circuit can be simplified.

DESCRIPTION OF REFERENCE NUMERALS

Figure 1:
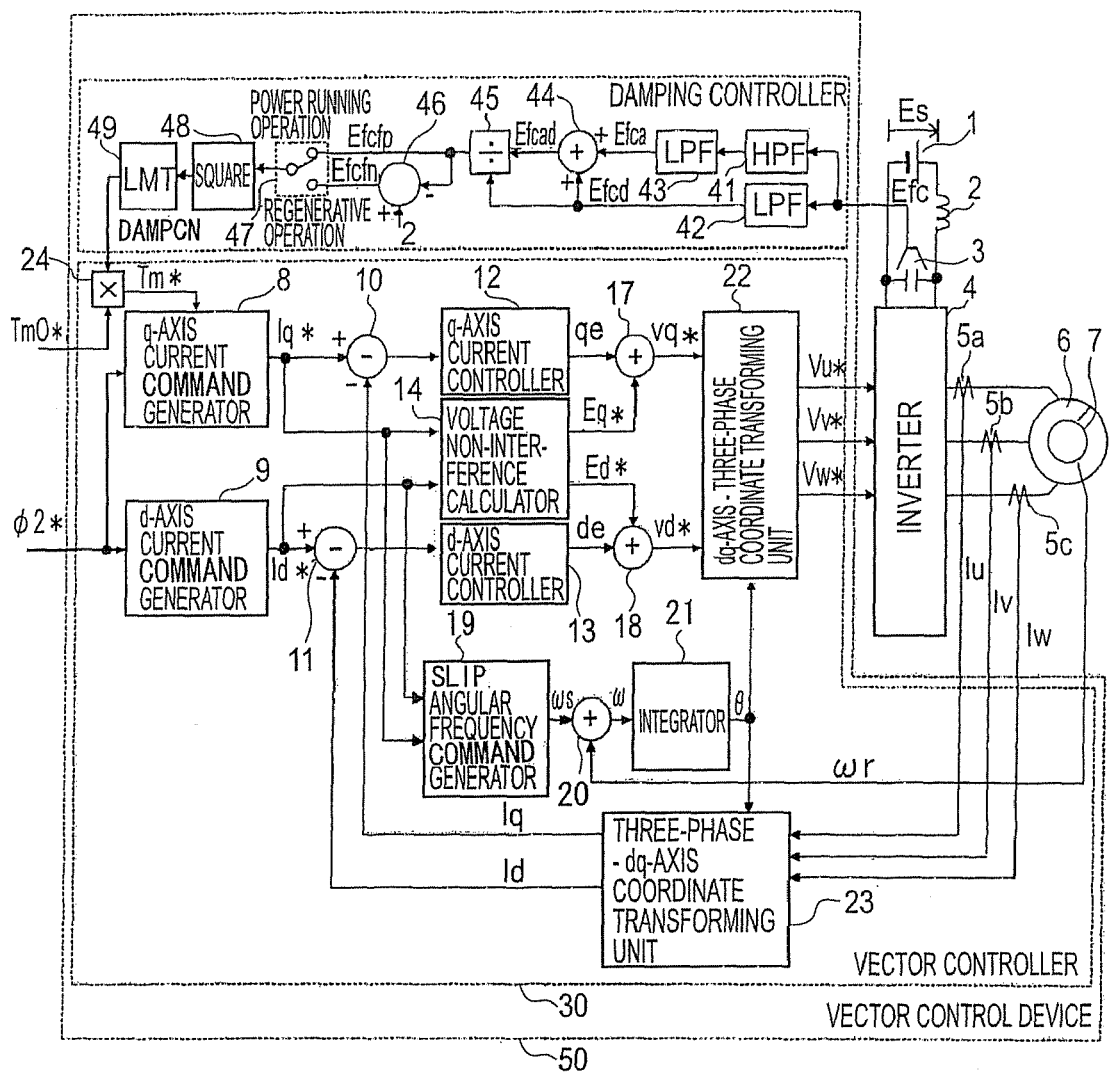
FIG. 1 is a block, diagram showing the construction of a vector control device for an alternating-current electric motor according to a first embodiment of the present invention.

1: DC power source
2: reactor
3: capacitor
4: inverter
5a to 5c: current detector
6: alternating-current electric motor
7: speed detector
8: q-axis current command generator
9: d-axis current command generator
10, 11: subtracter
12: q-axis current controller
13: d-axis current controller
14: voltage non-interference calculator
17, 18: adder
19: slip frequency command generator
20: integrator
21: integrator
22: dq-axis-three-phase coordinate transforming unit
23: three-phase-dq-axis coordinate transforming unit
24: multiplier
30: vector controller
40: damping controller
41: high pass filter
42: low pass filter
43: low pass filter
44: adder
45: divider
46: subtracter
47: switch
48: square calculator
49: limiter
50: vector control device
60: resistor

BEST MODE FOR CARRYING OUT THE INVENTION

First Embodiment

FIG. 1 is a block diagram showing the construction of a vector control device for an alternating-current electric motor according to a first embodiment of the present invention.

As shown in FIG. 1, a main circuit has a DC power source 1, an LC filter circuit comprising a reactor 2 and a capacitor 3 for suppressing flow-out of higher harmonic current to the power supply side, and an inverter 4 for converting the voltage Efc across the capacitor 3 (capacitor voltage) to an AC voltage having any frequency by an inverter 4, and has a vector control device 50 for executing vector control on an alternating-current electric motor 6.

The vector control device 50 is constructed by a vector controller 30 and a damping controller 40, and a signal ωr from a speed detector 7 for detecting the rotational speed of the alternating-current electric motor 6, signals Iu, Iv, Iw from current detectors 5a to 5c for detecting the current of the electric motor and a voltage Efc of the capacitor 3 are input to the vector control device 50.

If the current detectors of at least two phases are provided, the remaining phase can be calculated, and thus this construction may be adopted.

Furthermore, a speed sensorless vector control system in which the rotational speed of the alternating-current electric motor 6 is calculated without providing any current detector has been practically used, and in this case the speed detector 7 is unnecessary.

Furthermore, an example of the construction in which an induction motor is used as the alternating-current electric motor 6 will be described below. However, the damping controller 40 disclosed in this invention is also useful when a synchronous electric motor is used as the alternating-current electric motor 6.

Next, the construction of the vector controller 30 will be described.

The vector controller 30 performs so-called vector control of controlling the alternating-current electric motor on a dq-axis rotational coordinate system in which the axis coincident with a secondary magnetic flux axis of the alternating-current electric motor 6 is defined as d-axis and the axis orthogonal to the d-axis is defined as q-axis.

A torque basic command Tm0* and a secondary magnetic flux command Φ2* generated by a superordinate controller (not shown) and U-phase current Iu, V-phase current Iv and W-phase current Iw detected by the current detectors 5a to 5c are input to the vector controller 30, and the vector controller 30 controls the alternating-current electric motor 6 so that torque Tm generated by the alternating-current electric motor 6 is coincident with a torque command Tm* generated from the torque basic command Tm0* (a generating method will be described hereunder).

Next, the construction of each function block in the vector controller 30 will be described.

In a q-axis current command generator 8 and a d-axis current command generator 9, a d-axis (exciting component) current command id* and a q-axis (torque component) current command Iq* are calculated from the following equations (1) and (2) on the basis of the torque command Tm* obtained by multiplying the torque basic command Tm0* input from an external controller (not shown) by a damping operation amount DAMPCN (described later), the secondary magnetic flux command Φ2* and the circuit constant of the alternating-current electric motor 6.

Here, in the equations (1) and (2), L2 represents a secondary self-inductance and it is represented by L2=M+l2. M represents a mutual inductance, l2 represents a secondary leakage, s represents a differential operator, PP represents the number of paired poles and R2 represents secondary resistance of the alternating-current electric motor 6.

$$Iq^* = (Tm^*/(\Phi 2^* \cdot PP)) \cdot (L2/M) \quad (1)$$

$$Id^* = \Phi 2^*/M + L2/(M \cdot R2) \cdot s\Phi 2^* \quad (2)$$

In a slip angular frequency command generator 19, a slip angular frequency command ωs* to be given to the alternating-current electric motor 6 is calculated from the d-axis current command Id*, the q-axis current command Iq* and the circuit constant of the alternating-current electric motor 6 according to the following equation (6).

$$\omega s^* = (Iq^*/Id^*) \cdot (R2/L2) \quad (3)$$

The slip angular frequency command ωs* calculated from the equation (3) and the rotational angular frequency ωr as the output of the speed detector 7 secured to the end of the shaft of the alternating-current electric motor 6 are added in the adder 20 and set as an inverter angular frequency ω to be output from the inverter 4. The inverter angular frequency ω is integrated in the integrator 21 and the integration result is input as a phase angle θ of the coordinate transformation to the dq-axis-three-phase coordinate transforming unit 22 and a three-phase-dq-axis coordinate transforming unit 23.

In the three-phase-dq-axis coordinate transforming unit 23, the U-phase current Iu, the V-phase current Iv and the W-phase current Iw detected by the current detectors 5a to 5c are converted to the d-axis current Id and the q-axis current Iq on the dq coordinate which are calculated by the following equation (4).

[Equation 1]

$$\begin{pmatrix} Iq \\ Id \end{pmatrix} = \sqrt{\frac{2}{3}} \begin{pmatrix} \cos\theta & \cos\left(\theta - \frac{2}{3}\pi\right) & \cos\left(\theta + \frac{2}{3}\pi\right) \\ \sin\theta & \sin\left(\theta - \frac{2}{3}\pi\right) & \sin\left(\theta + \frac{2}{3}\pi\right) \end{pmatrix} \cdot \begin{pmatrix} Iu \\ Iv \\ Iw \end{pmatrix} \quad (4)$$

The subtracter 10 calculates the difference between the q-axis current command Iq* and the q-axis current Iq, and inputs the result to a q-axis current controller 12 at the subsequent stage. The q-axis current controller 12 subjects the input value to proportional-plus-integral control, and outputs a q-axis voltage compensation value qe.

The subtracter 11 calculates the difference between the d-axis current command Id* and the d-axis current Id, and inputs the result to a d-axis current controller 13 at the subsequent stage. The d-axis current controller 13 subjects the input value to proportional-plus-integral amplification and outputs a d-axis compensation value de.

A q-axis current error qe and a d-axis current error de are represented by the following equations (5) and (6). In the following equations, s represents a differential operator, K1 represents a proportional gain, and K2 represents an integration gain.

$$qe = (K1 + K2/s) \cdot (Iq^* - Iq) \quad (5)$$

$$de = (K1 + K2/s) \cdot (Id^* - Id) \quad (6)$$

In a voltage non-interference calculator 14, a d-axis feed forward voltage Ed* and a q-axis feed forward voltage Eq* are calculated from the following equations (7) and (8) on the basis of the d-axis current command Id*, the q-axis current command Iq* and the circuit constant of the alternating-current electric motor 6.

Here, in the equation (7) and the equation (8), and σ represents a leakage coefficient defined by σ=1−M²/(L1·L2). L1 represents a primary self-inductance of the electric motor, and it is calculated from L1=M+l1. L2 represents a secondary self-inductance, and it is calculated by L2=M+l2. (l1 represents a primary leakage inductance, and l2 represents a secondary leakage inductance).

$$Ed^* = -\omega \cdot L1 \cdot \sigma \cdot Iq^* + (M/L2) \cdot s\Phi 2^* \quad (7)$$

$$Eq^* = -\omega \cdot L1 \cdot \sigma \cdot Id^* + (\omega \cdot M \cdot \Phi 2^*)/L2 \quad (8)$$

In adders 17 and 18, the q-axis voltage compensation value qe and the q-axis feed forward voltage Eq* are added and set as a q-axis voltage command Vq*, the d-axis voltage compensation value de and the d-axis feed forward voltage Ed* are added and set as a d-axis voltage command Vd*, and they are input to the dq-axis-three-phase coordinate transforming unit 22.

The q-axis voltage command Vq* and the d-axis voltage command Vd* are represented by the following equations (9) and (10).

$$Vq^* = Eq^* + qe \quad (9)$$

$$Vd^* = Ed^* + de \quad (10)$$

Finally, three-phase voltage commands Vu*, Vv* and Vw* are generated from the q-axis voltage command Vq* and the d-axis voltage command Vd* by the dq-axis-three-phase coordinate transforming unit 22 to control the inverter 2.

As described above, the vector controller 6 performs the vector control which is added with the current feed back control so that the q-axis current Iq and the d-axis current Id corresponding to the current of the actual alternating-current electric motor 6 are coincident with the q-axis current command Iq* and the d-axis current command Id* calculated from the torque command Tm* and the secondary magnetic flux command Φ2*, and the alternating-current electric motor 6 outputs the torque Tm coincident with the torque command Tm* and rotates.

This control operation is basically similar to a well-known vector control and thus the detailed description of the operation is omitted.

Next, the construction of the damping controller 40 as a main part of the present invention will be described.

Before the damping controller 40 shown in FIG. 1 is specifically described, a cause of inducing electric oscillation in the LC filter circuit and the principle of suppressing the electrical oscillation of the LC filter circuit on which the construction of the damping controller according to the first embodiment of the present invention is based will be briefly described.

Figure 2:
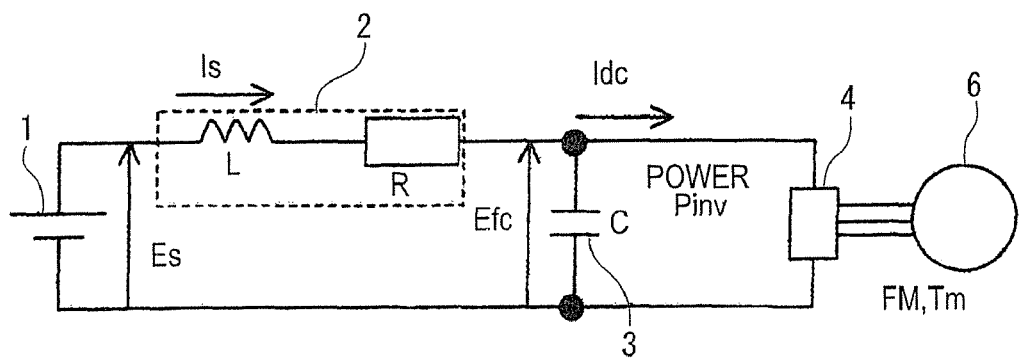
FIG. 2 is a diagram showing a circuit in which a constant-power controlled inverter is connected to an LC filter connected to a DC power source.

FIG. 2 is a diagram showing a circuit in which the constant-power controlled inverter 4 is connected to the LC filter connected to the DC power source 1. FIG. 2 is a diagram represented by simplifying the system of FIG. 1.

As shown in FIG. 2, the LC filter circuit comprising the reactor 2 and the capacitor 3 is connected to the DC power source 1, and also the inverter 4 for controlling the driving of the alternating-current electric motor 6 is connected to the capacitor 3. The reactor 2 comprises an inductance component L and a resistance component R. The electrostatic capacitance of the capacitor 3 is represented by C.

The inverter 4 is controlled so that the output of the alternating-current electric motor 6 is kept constant even when the capacitor voltage Efc varies, that is, a constant power characteristic is obtained with respect to the variation of the capacitor voltage Efc. That is, the inverter 4 is controlled so that the input power Pinv of the inverter 4 does not vary even when Efc varies.

In the thus-constructed system of FIG. 2, the inverter 4 viewed from the DC power source 1 side has a negative resistance characteristic.

The negative resistance characteristic is such a characteristic that when the capacitor voltage Efc rises, the inverter input current Idc decreases, and when the capacitor voltage Efc increases, the inverter input current Idc decreases, and it is known as a common sense that the normal resistance (positive resistance) means that current increases when the voltage increases and the current decreases when the voltage decreases.

As described above, the DC portion of the system shown in FIG. 2 has the negative resistance characteristic, and the inverter input current Idc decreases as the capacitor voltage Efc increases. Therefore, it operates to assist the increase of the capacitor voltage Efc. Conversely, the inverter input current Idc increases as the capacitor voltage Efc decreases, and thus it operates to assist the decrease of the capacitor voltage Efc. Therefore, braking does not act on the variation of the capacitor voltage Efc, the electric oscillation of the LC filter circuit is enlarged, and the capacitor voltage Efc continuously oscillates in the neighborhood of the resonance frequency of the LC filter. The foregoing description is a qualitative description.

Next, the phenomenon described above will be quantitatively described by determining and estimating a transfer function of the system of FIG. 2.

First, from the system of FIG. 2, the transfer function from the DC voltage Es to the capacitor voltage Efc is determined.

As described above, the inverter 4 is controlled so that the output thereof is fixed. In this case, the relational expression of the input power Pinv of the inverter, the capacitor voltage Efc and the inverter input current Idc is represented by the following equation (11).

[Equation 2]

$$Efc \cdot Idc = Pinv (=\text{constant}) \quad (11)$$

The above relation is non-linear, and thus it is linearized. In this case, when the operation points are represented by Efc0 and Idc0, the following equation (12) is satisfied in the neighborhood of these operation points.

[Equation 3]

$$Idc = -\frac{Pinv \cdot (Efc - Efc0)}{Efc0^2} + Idc0 \quad (12)$$

Figure 3:
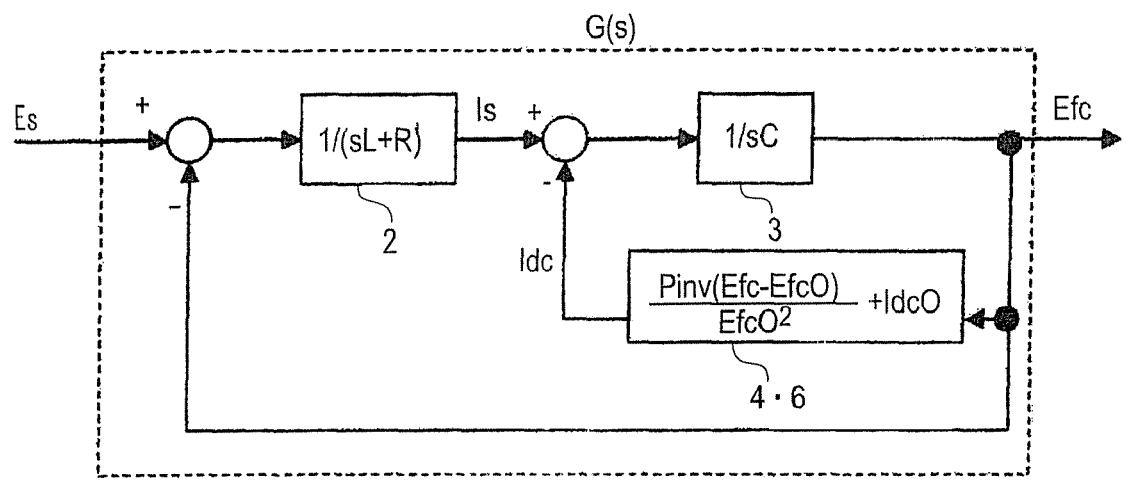
FIG. 3 is a block diagram showing a transfer function of the system of FIG. 2.

From FIG. 2 and the equation (12), the transfer function block diagram of the system shown in FIG. 2 is changed to that of FIG. 3.

From the transfer function block diagram shown in FIG. 3, a closed loop transfer function G(s) from the DC voltage Es to the capacitor voltage Efc is represented by the following equation (13).

[Equation 4]

$$G(s) = \frac{\frac{1}{C \cdot L}}{s^2 + \left(\frac{R}{L} - \frac{Pinv}{C \cdot Efc0^2}\right) \cdot s - \frac{1}{C \cdot L}\left(\frac{R \cdot Pinv}{Efc0^2} - 1\right)} \quad (13)$$

In order to make this transfer function G(s) stable, it is necessary that all the poles of G(s) are negative. That is, it is necessary that all the solutions of the characteristic equation shown in the following equation (14) which is the denominator of G(s) are negative.

[Equation 5]

$$s^2 + \left(\frac{R}{L} - \frac{Pinv}{C \cdot Efc0^2}\right) \cdot s - \frac{1}{C \cdot L}\left(\frac{R \cdot Pinv}{Efc0^2} - 1\right) = 0 \quad (14)$$

If the solutions of the above equation are assumed to be α and β, it is necessary that both the values are negative. Accordingly, the following equations (15) and (16) can be derived as a condition which makes G(s) stable. From the relationship between the solutions and the coefficients, the following equations (15) and (16) are determined.

[Equation 6]

$$\alpha + \beta = -\left(\frac{R}{L} - \frac{Pinv}{C \cdot Efc0^2}\right) < 0 \quad (15)$$

$$\alpha \cdot \beta = -\frac{1}{C \cdot L}\left(\frac{R \cdot Pinv}{Efc0^2} - 1\right) > 0 \quad (16)$$

The equation (16) does not contain any useful information, and thus it is neglected here. The equation (15) is rewritten into the following equation (17).

[Equation 7]

$$R > \frac{L}{C} \cdot \frac{Pinv}{Efc0^2} \quad (17)$$

From the equation (17), as L is smaller, C is larger, Pinv is smaller and Efc0 is larger, R required to stabilize the system may be smaller.

For example, by substituting the condition of general numerical values in an inverter system for driving an electric vehicle, that is, L=12 mH, C=6600 μF, Pinv=1000 KW and Efc0=1500V into the equation (17), the value of R which can stabilize the system satisfies R>0.8(Ω).

However, the resistance component existing at the DC side is equal to about several tens mΩ which is a minute value, and it is difficult for the resistance component concerned to satisfy the equation (17), so that the system is unstable and oscillation occurs in the LC filter circuit.

That is, it is understood that the capacitor voltage Efc oscillates and diverges unless a resistor satisfying the equation (17) is added or stabilization is forcedly performed.

Actually, addition of a resistor induces a large design of the apparatus and also increase of loss. Therefore, a method of forcedly performing stabilization is required, and specific examples are shown in the non-patent document 1 and the non-patent document 2.

A case where the load is a resistance (normally, positive resistance) load will be qualitatively described as in the case of the foregoing description.

Figure 4:
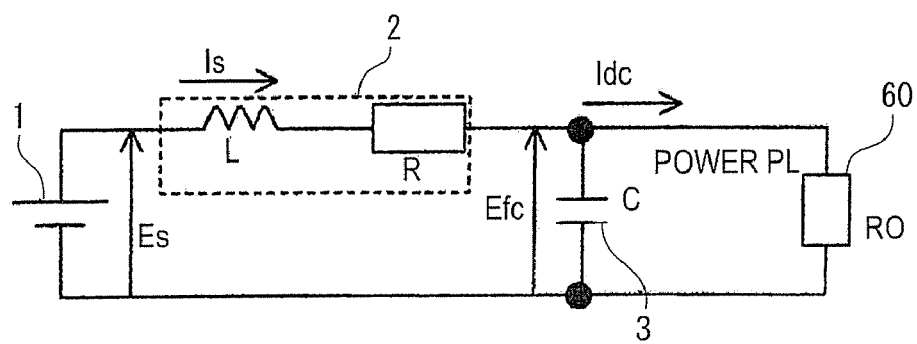
FIG. 4 is a diagram showing a circuit in which a load constructed by a resistor is connected to the LC filter connected to the DC power source.

FIG. 4 is a diagram showing a circuit in which a load constructed by a resistor 60 is connected to the LC filter connected to the DC power supply 1. As compared with the circuit shown in FIG. 2, the inverter 4 and the alternating-current electric motor 6 are replaced by the resistor 60. The resistance value of the resistor 60 is represented by R0.

Figure 5:
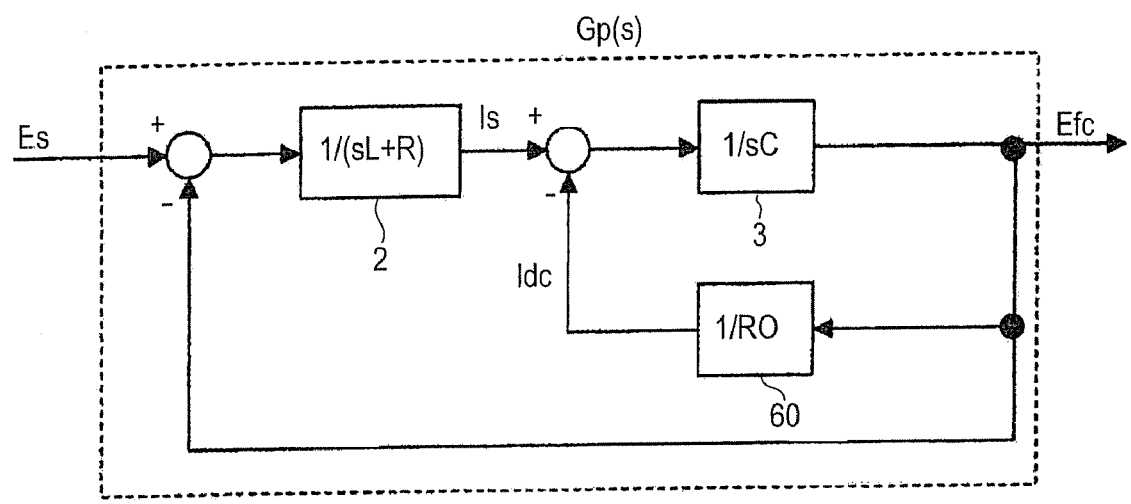
FIG. 5 is a diagram showing a transfer function block of the system of FIG. 4.

The transfer function block diagram of the system shown in FIG. 4 is shown in FIG. 5.

From FIG. 5, a closed loop transfer function Gp(s) from the voltage Es of the DC power 1 till the capacitor voltage Efc is represented by the following equation (18).

[Equation 8]

$$Gp(s) = \frac{\frac{1}{L \cdot C}}{s^2 + \left(\frac{1}{C \cdot R0} + \frac{R}{L}\right) \cdot s + \frac{1}{C \cdot L} \cdot \left(\frac{R}{R0} + 1\right)} \quad (18)$$

The characteristic equation of the closed loop transfer function Gp(s) shown in the equation (18) is represented by the following equation (19).

[Equation 9]

$$s^2 + \left(\frac{1}{C \cdot R0} + \frac{R}{L}\right) \cdot s + \frac{1}{C \cdot L} \cdot \left(\frac{R}{R0} + 1\right) = 0 \quad (19)$$

Since R>0, the condition that all the solutions of the characteristic equation shown in the equation (19) are negative are satisfied at all times. Accordingly, it is found that the system is stable at all times when the load is constructed by the resistor 60.

As described above, it is found that the circuit in which the resistor 60 is connected to the LC filter connected to the DC power source 1 is stable at all times. The present invention pays attention to this principle, and is characterized in that the inverter 4 is controlled so that the oscillation component of the capacitor voltage Efc is equivalent to the characteristic obtained when the resistor 60 is connected.

The characteristic of the circuit in which the resistor 60 is connected to the output of the LC filter as shown in FIG. 4 will be described below.

In the circuit of FIG. 4, assuming that current Idc flows in the resistor 60 under the capacitor voltage Efc, the power PR at the resistor 60 is represented by the following equation (20).

$$PR = Efc \cdot Idc \quad (20)$$

When the capacitor voltage Efc varies and it is n times as large as the initial value thereof, the current Idc flowing in the resistor 60 is likewise increased to n times. The power PRn at the resistor 60 at this time is represented by the following equation (21).

$$PRn = n \cdot Efc \cdot n \cdot Idc = n^2 \cdot Efc \cdot Idc = n^2 \cdot PR \quad (21)$$

That is, the power PRn at the resistor 60 is proportional to the square of the variation rate off the capacitor voltage Efc. Accordingly, by controlling the inverter 4 so as to satisfy the equation (21), the inverter 4 can be operated so as to have the positive resistance characteristic with respect to the variation of the capacitor voltage Efc.

The output of the alternating-current electric motor 6 is represented by the rotational frequency FM of the alternating-current electric motor 6× the output torque Tm, and this is equal to the input power Pinv of the inverter 4 if the loss is neglected. Therefore, the following equation (22) is satisfied.

$$Pinv = FM \cdot Tm \quad (22)$$

In order to make the inverter 4 operate so as to have the positive resistance characteristic with respect to the variation of the capacitor voltage Efc, it is required that the power Pinvn when the capacitor voltage Efc increases to n times satisfy the relationship of the following equation (23) as in the case of the equation (21).

$$Pinvn = n^2 \cdot Pinv = n^2 \cdot FM \cdot Tm \quad (23)$$

Here, the rotational frequency FM of the alternating-current electric motor 6 is a value varying in accordance with the speed of the electric vehicle. On the other hand, the resonance frequency of the LC filter circuit handled by the damping controller 40 is equal to 10 Hz to 20 Hz, and if it is converted to the period, it corresponds to the time of 50 ms to 100 ms. Accordingly, the oscillation period of the LC filter circuit is regarded as being sufficiently short with respect to the speed variation of the electric vehicle. Therefore, when the construction of the damping controller 40 is considered, there would be no problem even if the rotational frequency FM of the alternating-current electric motor 6 is fixed.

Accordingly, if the control is applied so that the torque Tm of the alternating-current electric motor 6 is increased by $n^2$ times when the capacitor voltage Efc is increased by n times, the inverter input power Pinv can be varied in proportion to the square of the variation rate of the capacitor voltage Efc.

That is, the torque command Tm* may be multiplied by the square value of the variation rate of the capacitor voltage Efc. According to the above operation, the inverter 4 has the positive resistance characteristic with respect to the variation component of the capacitor voltage Efc, and the electric oscillation of the LC filter circuit can be suppressed, so that the system can be stabilized.

Next, a specific construction of the method described above will be described with reference to FIGS. 1 and 6.

FIG. 6 is a diagram showing the relationship of signals in the damping controller 40 according to the first embodiment.

Figure 6A:
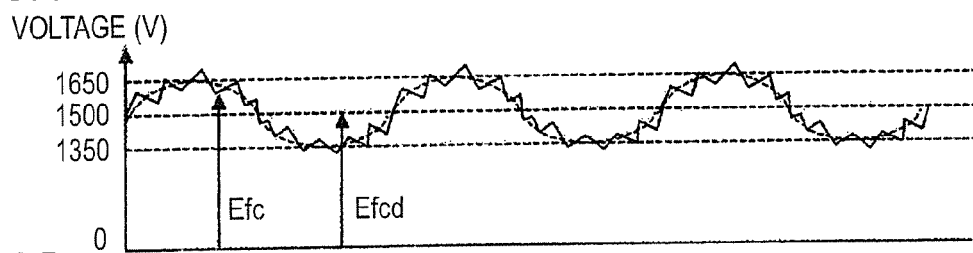
FIG. 6 is a diagram showing the relationship of the signals of respective parts of a damping controller according to the first embodiment of the present invention.
Figure 6B:
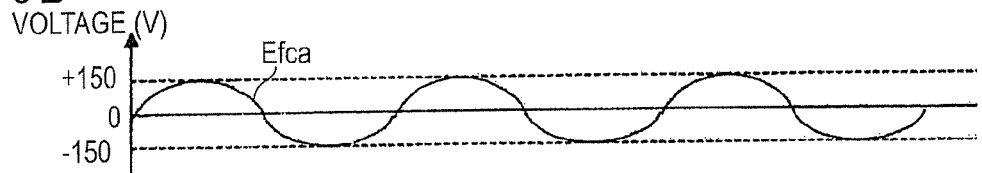
Figure 6C:
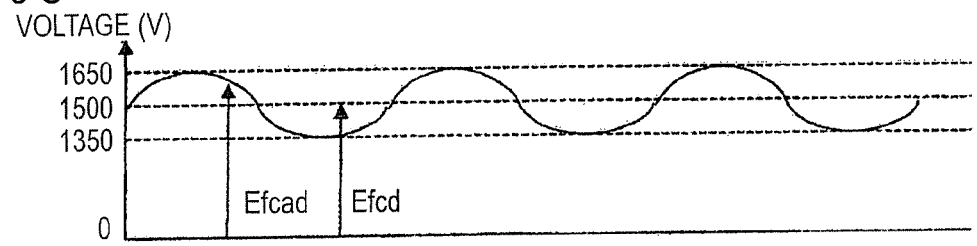
Figure 6D:
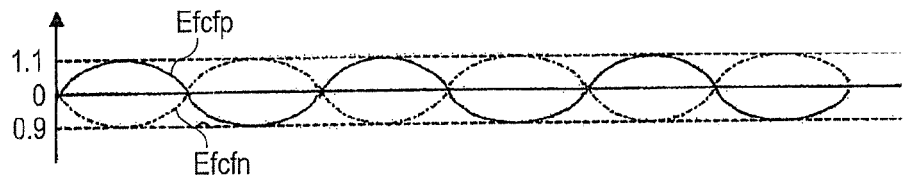
Figure 6E:
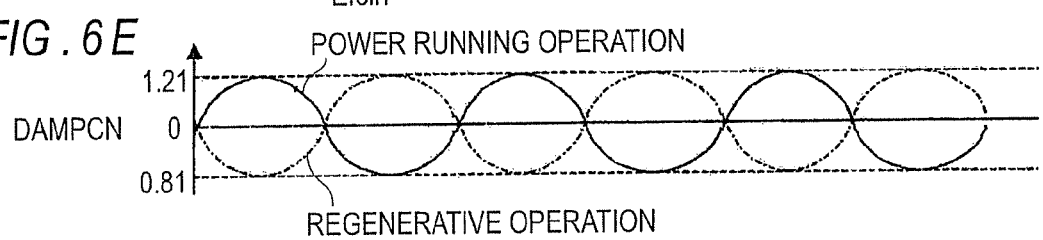

The voltage Efc of the capacitor 3 is input to the damping controller 40, and branched to two systems. With respect to one system, unnecessary high frequency components and unnecessary low frequency components are cut by a high pass filter (hereinafter referred to as HPF) 41 and a low pass filter (hereinafter referred to as LPF) 43, and an oscillation component Efca in which only the area around the resonance frequency of the LC filter circuit is extracted is calculated. For example, as shown in FIG. 6(a), when the capacitor voltage Efc oscillates between 1650V and 1350V around 1500V, Efca becomes a signal which varies with the same phase as the oscillation component of the capacitor voltage Efc in the range from +150V to −150V. With respect to the other system, only the DC component is extracted by LPF 42, and set as a DC component Efcd.

HPF 41, LPF 42 and LPF 43 are primary filters each of which is constructed by a primary delay element, and the construction thereof is well known and thus omitted from the description. Of course, they may be secondary or higher filters, however, the construction of the filter is complicated.

Here, the action of HPF 41, LPF 43 will be described.

The reason why LPF 43 is required is to remove high frequency components which are contained in the capacitor voltage Efc and serves as disturbance to the control system. However, the lower limit of the high frequency components which are required to be removed is equal to several hundreds Hz, and it is proximate to the resonance frequency band of the LC filter (normally, about 10 to 20 Hz) which is a damping control target. Therefore, if the high frequency components are removed by using only LPF 43, it affects the resonance frequency component of the LC filter which is contained in the oscillation component Efca, and causes phase delay. Therefore, this is not preferable.

Therefore, HPF 41 is added in series and combined with LPF 43 to construct a filter, whereby the phase delay of the resonance frequency component of the LC filter contained in the oscillation component Efca can be improved while securing the same high frequency component removing characteristic as when LPF 43 is solely used. With respect to the characteristics of HPF 41 and LPF 43, it is desired that the frequency at which the gain is equal to 1 is matched with the oscillation frequency of the LC filter (10 Hz to 20 Hz).

The oscillation component Efca calculated as described above is added with the DC component Efcd in the adder 44. The addition result is filtered and then set as the capacitor voltage Efcad (FIG. 6(c)).

Furthermore, after the filtering, the capacitor voltage Efcad is divided by the DC component Efcd in a divider 45 to calculate the variation rate Efcfp of the capacitor voltage Efc. Efcfp is directly input to a square calculator 48 when the alternating-current electric motor 6 is under power running operation.

When the alternating-current electric motor 6 is under regenerative operation, an regenerative operation inverted signal Efcfn obtained by subtracting the variation rate Efcfp of the capacitor voltage Efc from 2 in the subtracter 46 is selected by a switch 47, and input to the square calculator 48. This is because the direction of the power when the alternating-current electric motor 6 is under regenerative operation is opposite to that when the alternating-current electric motor 6 is under power running operation, and thus an operation of reducing the regenerative electric power when the capacitor voltage Efc increases and increasing the regenerative electric power when the capacitor voltage Efc decreases is required. The regenerative operation inverted signal Efcfn is a signal which is obtained by inverting the phase of the variation rate Efcfp of the capacitor voltage Efc (FIG. 6(*d*)).

The square calculator 48 squares the variation rate Efcfp of the capacitor voltage Efc or the regenerative operation inverted signal Efcfn, and inputs it to a limiter 49.

In the limiter 49, the upper limit and the lower limit are restricted to any values as occasion demands, and then output as a damping operation amount DAMPCN to the vector controller 30 (FIG. 6(*e*)). In the limiter 49, the setting is carried out, for example, when it is required to restrict a transit variation amount of the torque Tm of the alternating-current electric motor 6 in connection with the damping control.

Finally, in the vector controller 30, the damping operation amount DAMPCN is multiplied by the torque basic command Tm0*, and the vector control is executed by the torque command Tm* as a multiplication result. By executing the vector control on the basis of the thus-generated torque command Tm*, the inverter 4 is operated so as to have the positive resistance characteristic with respect to the variation of the capacitor voltage Efc to suppress the oscillation of the capacitor voltage Efc, so that the alternating-current electric motor 6 can be stably operated.

Figure 7:
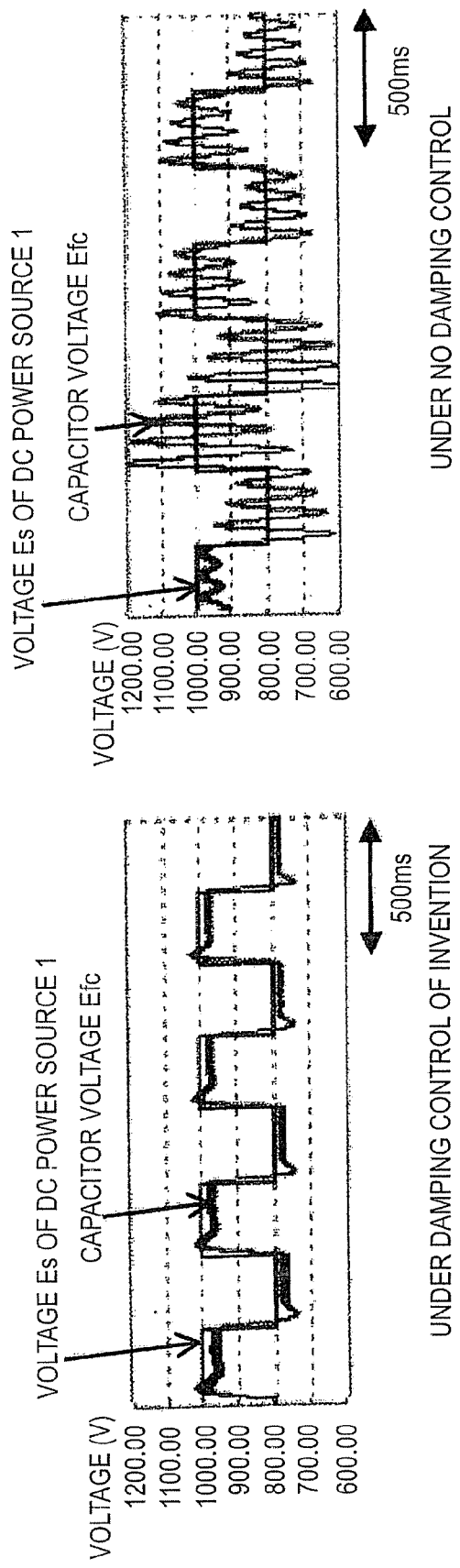
FIG. 7 is a diagram showing an operation simulation result of the vector control device for the alternating-current electric motor in the first embodiment of the present invention.

FIG. 7 is a diagram showing an operation simulation result of the vector control device of the alternating-current electric motor according to the first embodiment of the present invention.

FIG. 7 shows waveforms when the torque basic command Tm0* is set to about 500 N·m and the voltage Es of the DC power source 1 is stepwise varied at a period of 500 ms between 800V and 1000V during operation of the alternating-current electric motor 6 in the construction shown in FIG. 1.

As shown in FIG. 7, when the damping control of the present invention is not executed (the waveform at the right side of FIG. 7), large oscillation occurs in the capacitor voltage Efc every step variation of the voltage Es of the DC power source 1. However, when the damping control of the present invention is executed (the waveform at the left side of FIG. 7), oscillation hardly occurs in the capacitor voltage Efc irrespective of the step variation of the voltage Es of the DC current 1.

It can be confirmed from FIG. 7 that the damping control of the present invention can effectively suppress the oscillation of the capacitor voltage Efc.

As described above, according to the first embodiment of the present invention, the optimum damping operation amount DAMPCN is automatically calculated, and the damping controller in which the setting of the gain itself is unnecessary can be constructed. Furthermore, the constant of the alternating-current electric motor 6 is not used for the calculation of the damping operation amount DAMPCN, and thus the adjustment of the control system is not required even when the type of the alternating-current electric motor 6 is changed.

The foregoing description is made by using the case where the induction electric motor is used as the alternating-current electric motor 6. However, the construction of the damping controller and the calculation method of the damping operation amount described above may be applied to the vector controller when the same electric motor or another alternating-current electric motor is used.

In the construction shown in the first embodiment, the damping operation amount DAMPCN is integrated by the torque command Tm0*, however, the same effect can be obtained if it is multiplied by the q-axis current command Iq*.

In this embodiment, the damping operation amount DAMPCN is calculated on the basis of the variation rate n of the capacitor voltage according to DAMPCN $=n^2$ under the power running operation according to DAMPCN $=(2-n)^2$ under the regenerative operation. The rate of the variation component of the capacitor voltage to the DC component may be set to $\Delta n$ ($=n-1$), and the damping operation amount may be calculated according to DAMPCN$=(1+K^*\Delta n)^2$ under the power running operation and according to DAMPCN$=1$ under the regenerative operation when K represents a gain larger than 0.5. When the secondary or higher terms of $\Delta n$ are neglected, the variation component $\Delta$Idc=DAMPCN/n of the current flowing in the power conversion equipment to the variation of the capacitor voltage is as follows. Under the power running operation, $\Delta$Idc$=(1+K\cdot\Delta n)^2/(1+\Delta n)\cong 1=(2\cdot K-1)\cdot \Delta n$. Accordingly, if K>0.5, under the power running operation, when the capacitor voltage increases, the current flowing in the inverter increases, and when the capacitor voltage decreases, the current flowing in the inverter decreases. That is, the inverter can be controlled so that the current flowing in the inverter varies so as to suppress the variation with respect to the variation thereof of the capacitor voltage, and thus the electric oscillation of the LC filter circuit is prevented from being unstable. As K increases, the effect of the damping effect is more remarkable. However, when the capacitor voltage rapidly varies, the variation of the torque is more intense.

Under the regenerative operation, the direction of the current flowing in the inverter is opposite to that under the power running operation, and thus the inverter has no negative resistance characteristic even when carrying out a constant-power operation. Therefore, even when the damping operation is not carried out (DAMPCN=1), the electric oscillation of the LC filter circuit is not unstable. By setting DAMPCN$=(1-K\cdot\Delta n)^2$ or the like, the electric oscillation of the LC filter circuit can be more quickly attenuated. The gain K under the regenerative gain may be set to a value different from that under the power running operation.

The calculating formula of the damping operation amount DAMPCN is not required to be a quadratic expression of $\Delta n$, and it may be a linear expression, a cubic or higher polynomial expression, a fractional expression having polynomial expressions of $\Delta n$ as the numerator and the denominator or the like. With respect to the linear approximate expression to minute variation, any calculating formula may be used insofar as the coefficient of $\Delta n$ is larger than 1 in the calculating formula under the power running operation and the coefficient of $\Delta n$ is smaller than 0 in the calculating formula under the regenerative operation.

Furthermore, the construction of the first embodiment described above is an example of the present invention, and it may be combined with another well-known technique. Furthermore, it is needless to say that it may be modified so that a part thereof is omitted or the like without departing from the subject matter of the present invention.

Still furthermore, it is needless to say that the present invention is not limited to the vector control device of the alternating-current electric motor for electric railroad, and it may be applied to various relevant fields such as vehicles, elevators, power systems, etc.

The invention claimed is:

1. A vector control device for an alternating-current electric motor which has an LC filter circuit comprising a reactor and a capacitor at a direct-current power supply side and an inverter converting a voltage across the capacitor (capacitor voltage) to an AC voltage having any frequency, comprising:
  a vector controller for executing vector control on the alternating-current electric motor in accordance with a current command or a torque command; and
  a damping controller for calculating a damping operation amount for suppressing variation of the capacitor voltage, operating the current command or the torque command of the vector controller on the basis of the calculated damping operation amount, and controlling the inverter so that current flowing in the inverter varies so as to suppress the variation thereof with respect to the variation of the capacitor voltage, wherein the damping controller sets as the damping operation amount the value of a signal obtained by squaring the variation rate of the capacitor voltage under power running operation of the alternating-current electric motor, and sets as the damping operation amount the value of a signal obtained by squaring a signal which is obtained by inverting the phase of the variation rate of the capacitor voltage under regenerative operation of the alternating-current electric motor.

2. The vector control device for the alternating-current electric motor according to claim 1, wherein the damping controller divides the input capacitor voltage by a DC component contained in the capacitor voltage to calculate the variation rate of the capacitor voltage.

3. The vector control device for the alternating-current electric motor according to claim 1, wherein the damping controller adds a DC component contained in the capacitor voltage to a signal from which unnecessary high frequency components contained in the capacitor voltage are cut, and divides the addition signal by the DC component contained in the capacitor voltage, thereby calculating the variation rate of the capacitor voltage.

4. The vector control device for the alternating-current electric motor according to claim 1, wherein the damping controller limits upper and lower limits of the damping operation amount by a limiter.

5. The vector control device for the alternating-current electric motor according to claim 1, wherein the alternating-current electric motor is an alternating-current electric motor for driving an electric vehicle.

* * * * *